United States Patent [19]
Nielsen

[11] 3,772,702
[45] Nov. 13, 1973

[54] DUAL GATED AGC RADAR
[75] Alan H. Nielsen, Pompton Plains, N.J.
[73] Assignee: The United States of America as represented by the Secretary of the Air Force
[22] Filed: Apr. 29, 1971
[21] Appl. No.: 138,744

[52] U.S. Cl. .............................................. 343/18 E
[51] Int. Cl. ............................................ H04k 3/00
[58] Field of Search .................................. 343/18 E

[56] References Cited
UNITED STATES PATENTS
3,011,053  11/1961  Sev ............................. 343/18 E X
3,278,936  10/1966  Wolf ............................... 343/18 E Primary Examiner—T. H. Tubbesing
Attorney—Harry A. Herbert, Jr. and George Fine

[57] ABSTRACT

A dual gated AGC radar receiver is provided having independent AGC (automatic gain control) loops for ECM (electronic countermeasure) on and ECM off conditions. A detector provides controlling signals in the ECM on or off condition.

2 Claims, 1 Drawing Figure

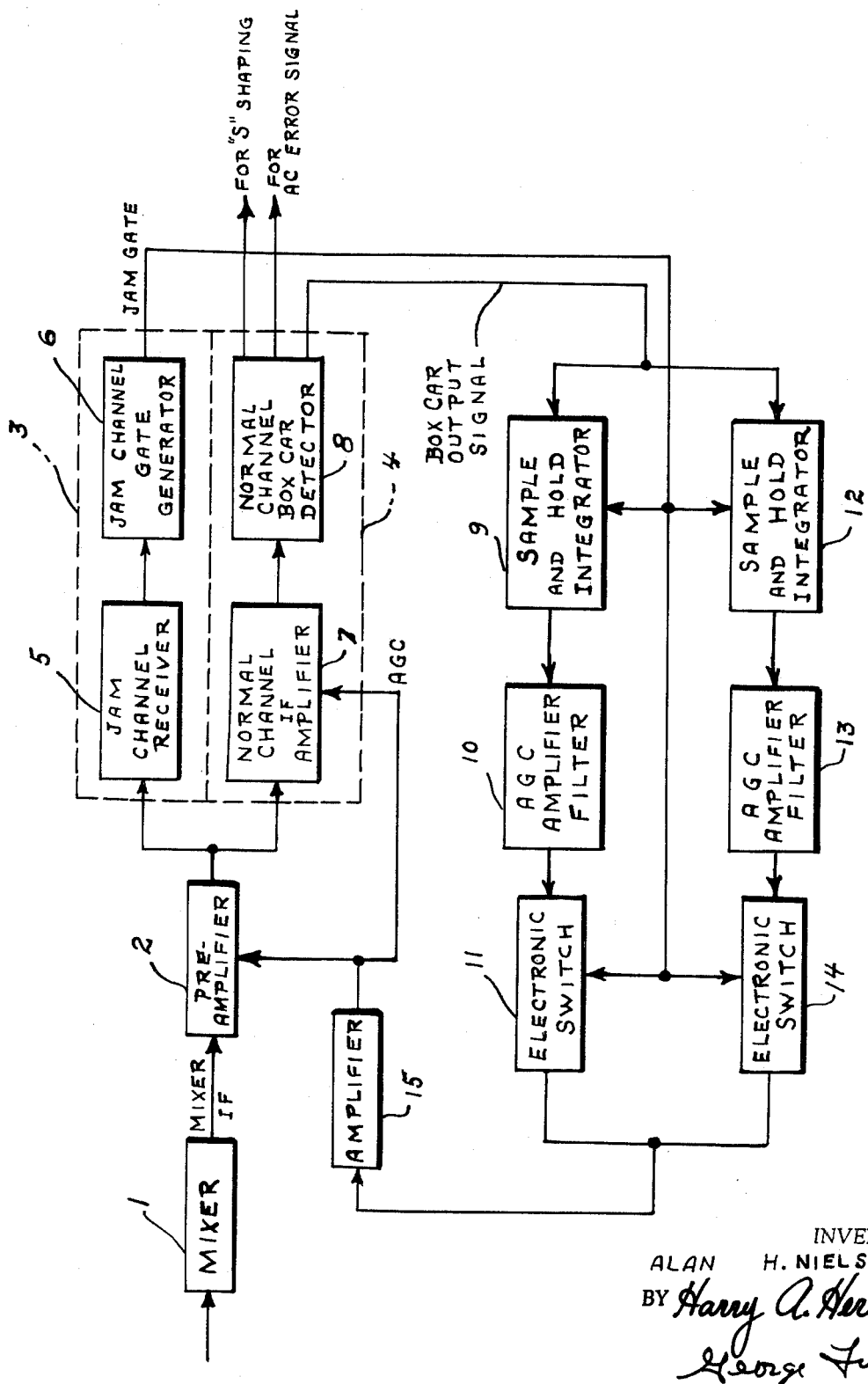

DUAL GATED AGC RADAR

BACKGROUND OF THE INVENTION

The invention relates to a radar receiver, and more particularly to a radar receiver resistant to electronic countermeasure techniques such as "countdown."

"Countdown" is an ECM (electronic countermeasure) technique which denies angle tracking error information to the radar. This is accomplished by providing large amplitude rectangular modulation on top of the target signal. This modulation occurs at a frequency to which the AGC loop in the radar cannot respond, and at a duty cycle which causes the signal to become saturated when the ECM is on and to become very small when the ECM is off. Very little error modulation can be recovered by the radar angle tracking circuits and the radar antenna drifts due to bias and angle track is lost.

The present invention provides an angle modulation receiver designed to be compatible with all modes of the radar and which provides a degree of invulnerability to countdown ECM. It does this by providing independent AGC loops for ECM on and ECM off conditions.

SUMMARY OF THE INVENTION

A dual gated AGC radar receiver is provided for minimizing jamming, particularly of the countdown type. Two signal channels are utilized, one being the normal radar signal channel having an amplifier and boxcar detail and the other a jamming channel having a receiver and a gate generator. There is also provided two AGC paths, each receiving a boxcar signal input from the boxcar detector. One of the AGC paths is provided for normal signal operation and the other for jamming signal operation. Each of the AGC paths includes a sample and hold circuit and an electronic switch. The output of the gate generator is connected to each of the sample and hold circuits and also to each of the switches. The magnitude of the AGC signal in each AGC path output is adjusted to be identical. In normal operation (no jamming), the normal AGC path is sampling and the switch therein is closed permitting an AGC voltage to control the gain of the normal radar signal channel. The jamming path is in hold with the switch therein open. When jamming is present, a gate signal is generated which operates to hold the normal AGC path and permits the jamming AGC path to sample. Simultaneously therewith, the switch in the normal AGC path is opened and the jamming AGC path is closed, thus permitting an AGC voltage, of equal amplitude to that of the normal AGC voltage, to be applied to the normal signal channel to prevent saturation thereof. The result is one AGC path maintains linear receiver operations in the presence of a normal radar signal, and the other maintains linear operation in the presence of a jamming signal.

DESCRIPTION OF THE DRAWINGS

The single FIGURE of the preferred embodiment shows in block diagram form a dual gated AGC radar receiver.

DETAILED DESCRIPTION OF THE PREFERRED EMBODIMENT

Now referring in detail to the single FIGURE of the invention, there is shown conventional radar mixer 1 receiving an input signal representative of a radar return target signal. The radar mixer output at IF (intermediate frequency) is amplified in conventional preamplifier 2. The preamplifier is arranged to accept an AGC signal for gain conrol purposes. The output of preamplifier 2 is divided between jamming channel 3 and normal IF channel 4. Jamming channel 3 is comprised of jam channel detection receiver 5 and jam channel gate generator 6. Normal IF channel 4 is comprised of normal channel IF amplifier and normal channel boxcar detector 8. The video output of normal channel IF amplifier 7 is received by boxcar detector 8 to be "S" shaped for range tracking. "S" shaped video is so named because the video has a positive excursion followed by a negative excursion. Boxcar detector 8 also provides in the conventional fashion a signal that becomes an AC error signal by obtaining the AC component thereof. Boxcar detector 8 is conventional and may be such as shown and described at pages 28, 257–263, and 273–278 in Radiation Laboratory Series, Vol. 24, published in 1950 by McGraw-Hill Company, Inc. It is also noted that the aforementioned reference also describes a boxcar operating in conjunction with an AGC circuit. Boxcar detector 8 is also shown and described at pages 168, 199, and 174–175 of Introduction to Radar Systems, by M. K. Skolnik, published in 1962 by McGraw-Hill Book Company, Inc.

The boxcar output is normally amplified in an AGC amplifier and applied to an AGC bus of an IF amplifier to control gain. This is the portion of the radar which is vulnerable to countdown. In order to prevent the vulnerability, it is necessary to prevent saturation in the presence of countdown. This is accomplished by providing two independent paths for amplification and filtering of the boxcar output to provide AGC voltage. One path, known as the normal AGC path, is comprised of conventional sample and hold integrator 9, AGC amplifier filter 10, and electronic switch 11. The other path, known as the jamming AGC path, is comprised of conventional sample and hold integrator 12, AGC amplifier, filter 13, and electronic switch 14. The rectangular form gate signal from jam channel gate generator 6 is simultaneoulsy fed to sample and hold generators 9, 12, and electronic switches 11 and 14. In normal operation (no jamming signals), sample and hold integrator is designed to sample and electronic switch 11 to be closed for passage therethrough of a signal. Simultaneoulsy therewith, sample and hold integrator is designed to hold and electronic switch 14 to be open to prevent signal flow therethrough. Thus, in normal operation, the normal AGC path is sampling and the jamming AGC path is holding. The boxcar output is then amplified and filtered in the normal AGC path, the output of which is connected to normal channel IF amplifier 7 and preamplifier 2 via electronic switch 11 and amplifier 15. It is noted that normal channel IF amplifier 7 is arranged to accept an AGC voltage for gain control purposes as is preamplifier 2.

In the presence of countdown jamming, the jam channel receiver and associated AGC loop (following a short transient) is captured by the countdown. The boxcar of the jam channel is then reproducing the countdown waveform which is squared up and becomes the jam gate. The jam gate signal is a rectangular wave which switches the normal AGC path sample and hold integrators and electronic switches to the jam AGC path when jamming is present Therefore, in the presence of jamming, the jam AGC path is on and the normal AGC path is holding.

In effect, this action provides two independent AGC loops. The result is one AGC loop maintains linear receiver operation in the presence of normal signal, and the other maintains linear operation in the presence of jamming. It is emphasized that the two AGC amplifiers are adjusted to provide the same video amplitude output from each AGC path. Therefore, the modulation can be recovered as the normal channel is always in linear operation.

As long as the receiver is linear, the objective is achieved and the radar will be invulnerable to countdown. When range deception is used, there is no target signal for the normal channel. However, the jamming signal can be used for modulation recovery and the tracking loop gain will be reduced by the duty cycle of the countdown waveform.

What is claimed is:

1. A dual gated AGC radar receiver for minimizing countdown type jamming comprising mixer means receiving a radar return echo signal, said radar return echo signal being normal in one instance and having a jamming signal imposed thereupon in another instance preamplifier means receiving the output signal from said mixer, said preamplifier means being arranged to receive an automatic gain control voltage signal, a normal signal channel, a jamming signal channel, each of said channels receiving the output signal from said preamplifier, said normal signal including in a first series arrangement an IF amplifier also arranged to receive an automatic gain control voltage signal, and a boxcar detector, said jamming signal channel including in a second series arrangement a receiver and a gate generator, said gate generator providing a rectangular output signal, a normal AGC path, a jamming AGC path, each of said paths being adjusted to provide output voltage signals of identical amplitude, each of said paths having a series arrangement of a sample and hold integrator, an amplifier, and an electronic switch, each of said sample and hold integrators and electronic switches receiving said rectangular output signal for control purposes, in normal operation said sample and hold integrator of said normal AGC path being arranged to sample and said electronic switch therein to pass a signal therethrough, simultaneously said sample and hold integrator of said jamming AGC path being arranged to hold and said electronic switch therein to be open, in jamming, said rectangular output signal controls said sample and hold integrator of said jamming AGC path to sample and said electronic switch therein to pass a signal therethrough, simultaneously said sample and hold integrator of said normal AGC path holds and said electronic switch therein opens, and means to interconnect said electronic switches with said IF amplifier and said preamplifier for gain control purposes.

2. A dual gated AGC radar receiver such as described in claim 1 wherein said means to interconnect consists of an amplifier.

* * * * *